United States Patent [19]
Osterberg et al.

[11] Patent Number: 5,873,438
[45] Date of Patent: Feb. 23, 1999

[54] TUNED MASS DAMPER WITH TUNABLE DAMPING AND ANTI FRICTION ROLLING MASS

[75] Inventors: David A. Osterberg, Glendale; Toren S. Davis, Peoria, both of Ariz.; Conor D. Johnson, Belmont, Calif.

[73] Assignee: Honeywell Inc., Minneapolis, Minn.

[21] Appl. No.: 591,922

[22] Filed: Jan. 25, 1996

[51] Int. Cl.[6] ..................................................... F16F 7/10
[52] U.S. Cl. .......................................... 188/379; 384/126
[58] Field of Search ............................ 212/272; 188/298, 188/322.18, 378, 379, 380; 181/207, 209; 244/54, 75 A, 17.27; 52/167.1; 267/33, 34, 177; 137/85; 384/125, 126, 127, 215

[56] References Cited

U.S. PATENT DOCUMENTS

| | | | |
|---|---|---|---|
| 965,838 | 7/1910 | Sanborn, Jr. | 267/177 X |
| 2,225,929 | 12/1940 | Sarazin | 181/209 X |
| 2,586,043 | 2/1952 | Hodgson et al. | 188/380 |
| 2,605,099 | 7/1952 | Brown | 267/33 |
| 3,091,307 | 5/1963 | Tiedemann et al. | 188/378 |
| 3,259,212 | 7/1966 | Nishioka et al. | 188/1 |
| 3,749,109 | 7/1973 | Rosenfeld et al. | 137/85 |
| 3,911,199 | 10/1975 | Fischer | 174/42 |
| 3,948,499 | 4/1976 | Eckersley et al. | 267/34 |
| 4,530,518 | 7/1985 | Newton | 280/758 |
| 4,935,838 | 6/1990 | Barger et al. | 361/148 |

OTHER PUBLICATIONS

"CSA Suspension System for Zero–Gravity Simulation" by CSA Engineering Inc., 1994.
"CSA Engineering, Inc. Engineering Services in Structural Dynamics", 8 pages one of which contains 9 two sided inserts, 1990.
ATZ, vol. 56, No. 4, Apr. 4, 1954, p. 114 XP 002026008 "Federung, Dynamische Stossdampfer".

Primary Examiner—Robert J. Oberleitner
Assistant Examiner—Pamela J. Lipka
Attorney, Agent, or Firm—Charles J. Ungemach

[57] ABSTRACT

A container with an inside surface and a mass mounted for oscillation in the container with a pair of bellows in the container each having a bias spring therein and a removable end to expose the interior of the bellows to exchange the spring for easy tuning of the damping characteristics and a plurality of balls, one each positioned in a plurality of troughs around the periphery of the mass proximate the ends there to bear against the inside surface so as to provide low friction oscillation of the mass in the container.

8 Claims, 2 Drawing Sheets

TUNED MASS DAMPER WITH TUNABLE DAMPING AND ANTI FRICTION ROLLING MASS

BACKGROUND OF INVENTION

1. Field of the Invention

The present invention relates to tuned mass damping devices and more particularly to such dampers which may find use in reducing the periodic motion of elongated structures such as booms. The invention may have particular utility with booms mounted on satellites to hold measuring equipment the accuracy of which may be reduced due to the sway of the boom resulting from disturbances such as thermal distortion shock caused by, for example, transient thermal distortions of solar panels.

2. Description of the Prior Art

In the prior art, tuned mass dampers for reducing sway are known. Such dampers usually contain a mass mounted for movement in a container of fluid or a magnetic field and positioned by a spring. By proper selection of the mass and spring, the mass will have the same natural frequency as the boom, or other device to which the damper is mounted, so that when the boom experiences shock and begins to sway in a direction, the mass begins to vibrate or oscillate in the same direction and at substantially the same frequency. However, since the boom is an input to the damper, the damper vibrates 180 degrees out of phase with the boom, which motion tends to cancel the boom motion. Since the boom is now vibrating at an off-resonant frequency and the damper has absorbed a substantial portion of its energy, the boom displacement is much smaller and is effectively damped out by the fluid or by the magnet in the damper. Such dampers are satisfactory for high frequency vibrations but because frequency is proportional to the ratio between the square root of the spring constant to the mass, at low frequencies e.g. 1.5 hertz, the mass becomes too large for the spring and cannot be effectively supported. The result is that the mass begins to sway and move in directions other than that required for proper damping.

BRIEF DESCRIPTION OF THE PRESENT INVENTION

The present invention overcomes the problems in the prior art by providing a damper with a mass which is constrained to move in the desired direction. By making the mass cylindrical and positioning it within a housing closely adjacent the mass, motion in the fluid container in only the desired direction is permitted. The fluid may be varied to make the vibration tunable and, in fact, the present invention provides for tunable damping without having to change the fluid. The tuning of the damping is accomplished by providing a pair of bellows with changeable internal springs therein to change the volumetric stiffness of the bellows and thus provide different characteristics to the fluid expansion and contraction in the chambers surrounding the mass. Thus, in testing the damping characteristics for a particular use, only the springs internal to the bellows need be changed for fine tuning. In the event that the sliding friction between the mass and the adjacent container housing is too large, a nearly frictionless motion is provided by using a linear bearing with, for example, circulating balls. A specific improvement to the ball bearing mounting is shown in the present invention by the use of a plurality of linear troughs in the mass each of which entraps a single ball so that there is no sliding friction between the mass and the walls or between adjacent balls.

DETAILED DESCRIPTION OF THE PREFERRED EMBODIMENT

Figure 1:
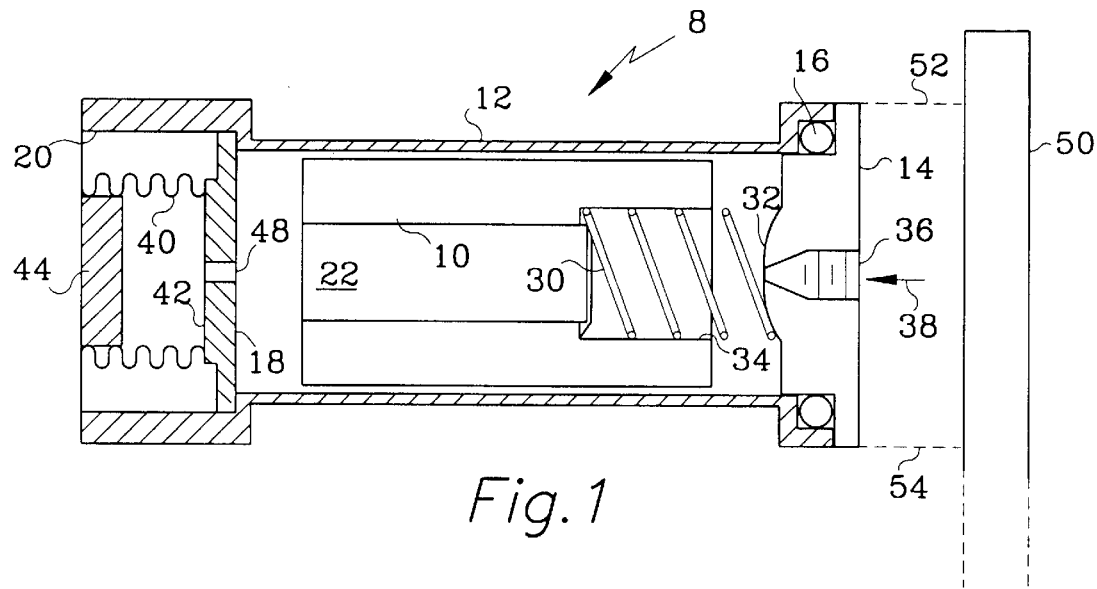
FIG. 1 shows an example of the basic tuned damper of the present invention; and, FIG. 2 shows a second embodiment of the present invention incorporating both the fine tuning of damping and reduction of friction with motion of the mass.

In FIG. 1 a damper 8 is shown comprising a hollow moveable mass 10, slideably mounted in a cylindrical container 12 having a first end piece 14 fastened to cylinder 12 by conventional means, such as bolts, not shown and sealed to prevent fluid loss by a grommet 16. A second end piece 18 is fastened at a second end in a recess 20 of cylinder 12 by conventional means such as bolts, also not shown. The cylinder 12 and end pieces 14 and 18 form a chamber 22 within which mass 10 may move back and forth.

A spring 30 of predetermined stiffness is fastened at one end thereof to a protrusion 32 of end piece 14 and at the other end thereof to a recess 34 in mass 10 so that mass 10 will be positioned by spring 30 until subjected to a force allowing mass 10 to oscillate, only horizontally, back and forth in chamber 22 at a frequency determined by the size of mass 10 and stiffness of spring 30.

The first end piece 14 has a filling port 36 therethrough which allows the introduction of a damping fluid, shown by arrow 38, into the chamber 22. After filling, port 36 is sealed in conventional manner.

At the second end of cylinder 12, in recess 20, a thermal expansion bellows 40 is connected at one end thereof to a protrusion 42 in end piece 18 and at the other end thereof to a sealing member 44. End piece 18 has a small opening 48 therethrough connecting the interior of bellows 40 to chamber 22. This allows transfer of fluid from chamber 22 to the interior of bellows 40 to accommodate expansion and contraction of the fluid under modest temperature variations.

In one application of the apparatus of FIG. 1, the damper may be used to compensate for unwanted vibrations of, for example, a boom shown in FIG. 1 by reference numeral 50. The unwanted oscillations will be transverse to the length of the boom and accordingly it is desired that the mass 10 move in the same direction, i.e. from right to left in FIG. 1. Accordingly, the damper 8 is shown mounted to boom 50 horizontally as indicated by dashed lines 52 and 54 and, as explained above, will vibrate 180 degrees out of phase with the boom to help cancel the boom motion.

For many applications, the apparatus of FIG. 1 will perform satisfactorily, but for some high accuracy or specialized uses, there may be inaccuracies or unnecessary costs associated with the FIG. 1 damper. For example, in order to provide the exactly correct amount of damping, the damping fluid 38 in chamber 20 is first chosen to have a viscosity which is believed to provide the best absorption of energy from the oscillating system and provide the desired amount of damping for the specific intended use. The boom and the damper are then tested to check the damping characteristics and, if they are not right, the fluid has to be drained and new fluid with different viscosity inserted for a re-test. This process is repeated until the desired damping characteristics of the system are obtained. Such a procedure is quite costly and time consuming and adds considerable cost to the damper.

Another difficulty with the FIG. 1 damper is a result of mass 10 sliding in chamber 22 because too much friction may be involved for optimum damping effectiveness. Conventional linear bearings may be used to reduce the friction and in some cases may be sufficient. However, even using conventional linear bearings between mass 10 and the interior of cylinder 12 there may be too much friction because of contact between the balls. These problems are overcome with the improvements of FIG. 2.

Figure 2:
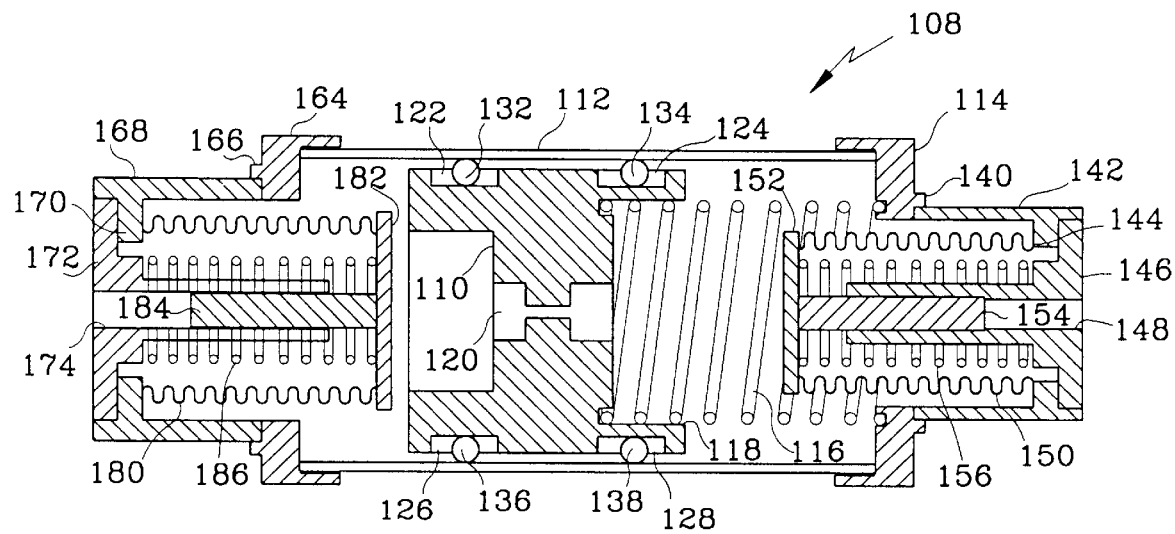

In FIG. 2, a damper 108 (which may also be attached to a boom as in FIG. 1 but not shown in FIG. 2 for simplicity) is shown comprising a moveable mass 110, slideably mounted in a cylindrical container 112 having a first cylindrical end piece 114 fastened to the right end of cylinder 112 by conventional means, not shown. A spring 116 has a first end fastened in a recess 118 of mass 110 and a second end fastened to end piece 114 so that mass 110 is positioned thereby. Mass 110 is shown having an orifice 120 extending between its left and right sides in FIG. 2 so as to permit the passage of the damping fluid therethrough. The damping fluid may be inserted in the cylindrical container 112 in a manner similar to that shown in FIG. 1. As was the case in FIG. 1, the mass 110 and the spring 116 are chosen to have the frequency of oscillation matching the particular use to which it is to be put e.g. the frequency of the boom to which it will be mounted.

Figure 3A:
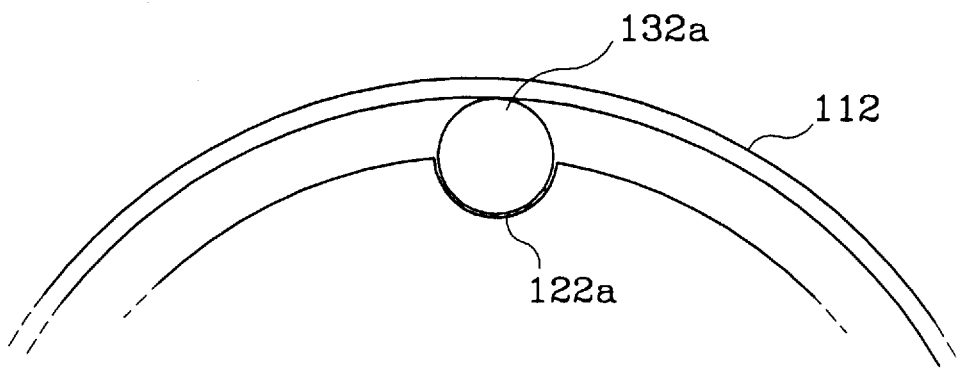
FIGS. 3a and 3b show partial side views of 2 alternate arrangements of ball and groove bearings for FIG. 2.
Figure 3B:
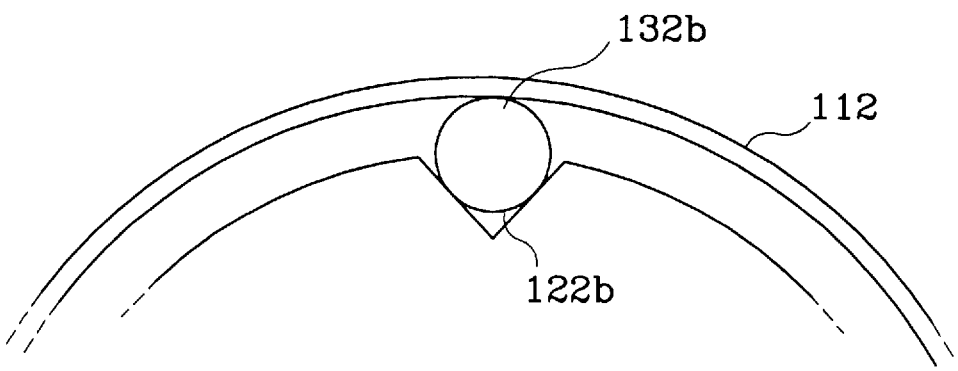

A plurality of troughs 122, 124, 126 and 128 are shown in the outer edge of mass 110 and are cross-sectionally shaped to constrain the movement of balls such as 132, 134, 136 and 138 in all but the desired direction, horizontally in FIG. 2. For example, the grooves may be of slightly greater diameter than the balls as is shown in FIG. 3a where a semicircular groove 122a supports the ball 132a, or, as shown in FIG. 3b, may be a "V" shaped groove 122b supporting a ball 132b. In either case, the ball is constrained for motion only into and out of the plane of the paper. The plurality of balls 132, 134, 136 and 138 in the troughs 122, 124, 126 and 128 respectively engage the inner surface of cylinder 112 and provide rolling motion for mass 110. The lengths of the troughs are made to accommodate the amount of motion expected of mass 110 oscillating back and forth in use. In the event that the mass 110 moves more than expected, the balls (although moving less distance than the mass) may nevertheless reach the ends of the trough where they may encounter greater friction due to the worming effect and/or tolerance errors. However, the device is completely self centering so that when the motion decreases to the expected limits, the balls will move to the center and at rest assume the position shown in FIG. 2. This feature assures the device will remove the maximum amount of energy from the system by minimizing mass friction. There should be at least two troughs around the diameter of mass and preferably three or more to prevent any contact between the outer surface of mass 110 and the inner surface of cylinder 112. Using the balls eliminates the sliding friction between the mass 110 and the cylinder 112 and since a single ball is used, there is no friction between balls. Thus the possible excessive friction of the FIG. 1 damper has been avoided.

Cylindrical end piece 114 has an abutment 140 and a first cylindrical end member 142 is seated thereon. Cylindrical end member 142 has an inwardly extending ledge 144 and a removable end cap 146 with a hole 148 extending centrally therethrough. End cap 146 is mounted against ledge 144. A first bellows 150 has a right end which is fixed to the ledge 144 and extends to the left towards the interior of cylindrical container 112. The left end of bellows 150 is sealed to a circular plate 152 which has a central rod 154 extending back to the right so as to be guided in the hole 148. A spring 156 is positioned in the interior of bellows 150 between the circular plate 152 and the end cap 146 and provides additional volumetric stiffness to the bellows 150.

The left end of damper 108 in FIG. 2 is similar to the right end. A second cylindrical end piece 164 is fastened to the left end of cylindrical container 112 by conventional means, not shown. End piece 164 has an abutment 166 and a second cylindrical end member 168 is seated thereon. Cylindrical end member 168 has an inwardly extending ledge 170 and a removable end cap 172 with a hole 174 extending therethrough. End cap 172 is mounted against ledge 170. A second bellows 180 has a left end which is fixed to the ledge 170 and extends to the right towards the interior of cylindrical container 112. The right end of bellows 180 is sealed to a circular plate 182 which has a central rod 184 extending back to the left so as to be guided in the hole 174. A spring 186 is positioned in the interior of bellows 180 between the circular plate 182 and the end cap 172 and provides additional volumetric stiffness to the bellows 180.

It is seen that as the mass 110 moves to the right and left in FIG. 2, the fluid pushes against circular plates 152 and 182 to collapse bellows 150 or 180 against the force supplied by spring 156 or 186. The amount of damping that this provides to the system is controlled in part by the stiffness of the springs 156 and 186 so all that is needed to change or fine tune the damping effect, is to remove the end caps 146 and 172 and replace springs 156 and 186 with springs having different stiffness. Thus, testing of the damper is considerably easier, much less time consuming and less expensive than the draining and replacement of the fluid as in FIG. 1.

It is thus seen that we have provided a damper that is constrained to move only in the desired direction for proper damping at low frequencies. We have also provided a damper that is easily fine tuned and has a minimum of friction between the moving mass and the container. Although the present invention has been described with reference to preferred embodiments, workers skilled in the art will recognize that changes may be made in form and detail without departing from the spirit and scope of the invention. For example, in the event that it is desired to accommodate the damper to extreme forces, as, for example, the force exerted on the equipment upon take off from a launching site, additional springs located near the interior portions of end pieces 114 and 164 may be employed to provide a soft stop for mass 110. Also, if reduced rolling friction is desired but extreme accuracy is not required, the first and second bellows may be omitted and a single temperature compensating bellows such as shown in FIG. 1 employed. Furthermore, when the oscillations to be damped may occur in more than one plane, two dampers mounted on the member at right angles to each other may be employed.

The embodiments of the invention in which an exclusive property or right is claimed are as follows:

1. A tuned mass damper for use in damping oscillatory motions comprising:
   a container having side portions and end portions;
   a mass positioned in said container for oscillatory motion between the end portions, said mass dividing said container into first and second end chambers;
   a passage connecting said first and second end chambers to allow restricted fluid flow therebetween;
   spring means connected to one end portion and to the mass to position the mass at a central rest position, the stiffness of the spring means and the size of the mass being chosen to provide an oscillatory motion at a desired predetermined frequency;

first and second bellows one mounted at each end portion of the container with each bellows containing a bias spring of predetermined stiffness; and removable means sealing the ends of each bellows so that the bias springs may be removed and replaced with alternate bias springs of different stiffness to alter the damping characteristics of the damper.

2. Apparatus according to claim 1, further including a fluid of predetermined viscosity in the container, the viscosity of the fluid and the amount of restriction of the passage being chosen to approximate the desired damping characteristics and the change of bias springs providing the fine tuning of the damping characteristics.

3. Apparatus according to claim 1 further including a plurality of troughs around the periphery of the mass; and a plurality of balls, only one located in each trough and bearing against the side portions of the container to provide minimum friction for the motion of the mass.

4. Apparatus according to claim 2 further including a plurality of troughs around the periphery of the mass; and a plurality of balls, one located in each trough and bearing against the side portions of the container to provide minimum friction for the motion of the mass.

5. Apparatus according to claim 4 wherein the container is a circular cylinder of a first interior correctional diameter and the mass is a cylinder of cross-sectional diameter less than the first interior cross-section by an amount sufficient to entrap the balls between the trough and the interior of the container.

6. A damper system comprising:

A. a tuned mass damper including i) a container having side portions and end portions; ii) a mass positioned in said container for oscillatory motion between the end portions, said mass dividing said container into first and second end chambers; iii) a passage connecting said first and second end chambers to allow restricted fluid flow therebetween; iv) spring means connected to one end portion and to the mass to position the mass at a central rest position, the stiffness of the spring means and the size of the mass being chosen to provide an oscillatory motion at a desired predetermined frequency; v) first and second bellows, one mounted at each end portion of the container, with each bellows containing a bias spring of predetermined stiffness; and, vi) removable means sealing the ends of each bellows so that the bias springs may be removed and replaced with alternate bias springs of different stiffness to alter the damping characteristics of the damper;

B. an oscillating member which has the predetermined frequency of oscillation; and, C. Means mounting the damper on the member, the damper operating to remove energy from the member and provide optimum damping.

7. Apparatus according to claim 6 including:

D. a second damper mounted on the member at right angles to the damper to damp oscillations in transverse directions.

8. A tunable damper comprising:

a cylinder having an interior surface of predetermined diameter circular cross-section and first and second ends;

first and second end covers closing the first and second ends of the container, said first and second end covers having a first and second bellows respectively extending into the interior of the container, said bellows having a first and second springs respectively of predetermined stiffness biasing the bellows and a removable end piece exposing the interior of the bellows to facilitate changing of the spring to one of a different stiffness;

a fluid of predetermined viscosity in the interior of said cylinder;

an oscillatory member having a circular exterior surface of predetermined diameter less than the interior surface of the cylinder, said oscillatory member having a predetermined mass and having first and second ends with an orifice therebetween;

a third spring of predetermined stiffness connected between one end cover and said oscillatory member to position said oscillatory member for oscillatory motion in the fluid in said container;

at least three troughs in the exterior surface of the oscillatory member, spaced around the periphery thereof proximate the ends and of length chosen to accommodate the amount of oscillatory motion of the oscillatory member; and a plurality of balls, only one in each trough and bearing against the interior surface of the circular cylinder to provide low friction self centering motion of the oscillatory member in the container.

* * * * *